United States Patent
Wittstadt et al.

(10) Patent No.: US 11,621,599 B2
(45) Date of Patent: Apr. 4, 2023

(54) INSULATING UNIT FOR AN ELECTRIC MACHINE

(71) Applicant: ZF FRIEDRICHSHAFEN AG, Friedrichshafen (DE)

(72) Inventors: Ralf Wittstadt, Niederwerrn (DE); Katja Willacker, Wiesentheid (DE); Jochen Wittmann, Burkardroth (DE); Stefan Reuter, Hammelburg (DE); Andre Grübel, Königsberg (DE); Matthias Ebert, Himmelstadt (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 12 days.

(21) Appl. No.: 16/980,232

(22) PCT Filed: Feb. 20, 2019

(86) PCT No.: PCT/EP2019/054173
§ 371 (c)(1),
(2) Date: Sep. 11, 2020

(87) PCT Pub. No.: WO2019/174877
PCT Pub. Date: Sep. 19, 2019

(65) Prior Publication Data
US 2021/0036570 A1 Feb. 4, 2021

(30) Foreign Application Priority Data
Mar. 15, 2018 (DE) .................... 10 2018 203 993.3

(51) Int. Cl.
*H02K 3/38* (2006.01)
*H02K 3/04* (2006.01)
(Continued)

(52) U.S. Cl.
CPC .................. *H02K 3/38* (2013.01); *H02K 3/04* (2013.01); *H02K 15/0421* (2013.01); *H02K 15/105* (2013.01)

(58) Field of Classification Search
CPC ............ H02K 3/38; H02K 3/50; H02K 3/505; H02K 3/51; H02K 3/52; H02K 3/521; H02K 3/522
See application file for complete search history.

(56) References Cited

U.S. PATENT DOCUMENTS

| 9,525,316 B2 | 12/2016 | Kleber | |
| 2010/0264757 A1 | 10/2010 | Asou et al. | |
| 2012/0274156 A1* | 11/2012 | Chamberlin | H02K 5/20 310/58 |

FOREIGN PATENT DOCUMENTS

| DE | 10321702 | 1/2004 |
| DE | 102013001990 | 8/2013 |

(Continued)

OTHER PUBLICATIONS

WO-2017032537-A1 machine translation Feb. 12, 2022.*

(Continued)

*Primary Examiner* — Ahmed Elnakib
*Assistant Examiner* — Leda T Pham
(74) *Attorney, Agent, or Firm* — Cozen O'Connor

(57) ABSTRACT

An insulating unit for an electric machine with hairpin winding. The hairpin winding has a plurality of connection pins for electrically connecting to an interconnect and a plurality of welded hairpin ends. A base body is provided having an insulating material and extends at least over a portion of the circumference of the hairpin winding. The base body has a receiving area which faces the hairpin winding and which has openings for receiving the hairpin ends. The dividing walls are provided between the openings (Continued)

in circumferential direction, and the openings and/or dividing walls have fasteners for engaging connection to the hairpin ends.

14 Claims, 4 Drawing Sheets

(51) Int. Cl.
*H02K 15/04* (2006.01)
*H02K 15/10* (2006.01)

(56) References Cited

FOREIGN PATENT DOCUMENTS

| EP | 3082229 | 10/2016 | | |
|----|---------|---------|---|---|
| JP | S5615146 | 2/1981 | | |
| JP | 2000209802 | 7/2000 | | |
| JP | 2013207912 | 10/2013 | | |
| WO | WO-2013114729 A1 * | 8/2013 | ............... | H02K 3/38 |
| WO | WO 2013190677 | 12/2013 | | |
| WO | WO 2017032537 | 3/2017 | | |
| WO | WO-2017032537 A1 * | 3/2017 | | |

OTHER PUBLICATIONS

WO-2013114729-A1 machine translation Feb. 12, 2022.*
Office Action of the corresponding German Patent Application No. 10 2018 203 993.3.

* cited by examiner

INSULATING UNIT FOR AN ELECTRIC MACHINE

CROSS REFERENCE TO RELATED APPLICATIONS

This is a U.S. national stage of Application No. PCT/EP2019/054173 filed Feb. 20, 2019. Priority is claimed on German Application No. DE 10 2018 203 993.3 filed Mar. 15, 2018, the content of which is incorporated herein by reference.

BACKGROUND OF THE INVENTION

1. Field of the Invention

The present invention is directed to an insulating unit for an electric machine with a winding formed of a plurality of shaped rods that pass through at least two slots spaced apart in circumferential direction and that have contact points on one side of the electric machine connected to one another to form the winding. Such windings are also referred to as hairpin windings or wave windings. In the following, only the designation hairpin or hairpin winding will be used, with wave windings and the like being comprehended within the meaning of the application.

2. Description of Related Art

It is known in the prior art in windings of electric machines, particularly of the stator, to cover uninsulated areas with an insulating potting compound. For hairpin windings, it is known that the uninsulated hairpin ends at the end winding, which are connected to one another to form the coils, are to be insulated from one another and from the environment by a potting compound after connecting. The potting compound is applied either as a coating to the individual hairpin ends, or the end winding in its entirety is potted to form a block. Problems exist in the prior art with respect to the application and processing of the potting compound, particularly an amount to be applied and the set of problems involved in realizing a sufficient covering while at the same time preventing potting compound from being applied to parts of the electric machine that should not be coated.

SUMMARY OF THE INVENTION

It is an object of one aspect of the present invention to provide an insulation of the hairpin ends that can be produced simply and quickly and which reliably insulates the hairpin ends.

According to one aspect of the invention, an insulating unit for an electric machine with a hairpin winding in which the hairpin winding has a plurality of connection pins for electrically connecting to an interconnect and a plurality of welded hairpin ends is characterized in that a base body is provided that has an insulating material and extends at least over a portion of the circumference of the hairpin winding, in that the base body comprises at the underside a receiving area which faces the hairpin winding and which has openings for receiving the hairpin ends, and dividing walls are provided between the openings at least in circumferential direction, and in that the openings and/or dividing walls have fastening elements for frictionally engaging connection and/or positively engaging connection to the hairpin ends.

A hairpin winding is formed from a plurality of hairpins or shaped rods having contact points at the ends thereof at the end winding. The contact points are electrically conductively connected to one another in pairs in each instance in order to produce the coils of the hairpin winding from the hairpins. The contact points which are connected to one another in pairs are referred to as hairpin ends, and the respective individual contact points at the start and end of the respective coils are referred to as connection pins. The connection pins are electrically conductively connected to an interconnect in order to connect to the power electronics for controlling the electric machine.

The use of a flowable potting compound can be avoided and the positioning and handling can be appreciably facilitated through the use of an insulating unit as discrete component part. The insulating unit has a base body comprising an electrically insulating material. Plastic is preferably used as material, but embodiment forms with rubber or other elastic materials, or even ceramic materials, are also possible. The base body can be formed in one piece or from a plurality of pieces and extends over at least a portion of the circumference. Depending on the type of construction, the distances between the connection pins and hairpin ends can be smaller particularly in the region of the connection pins, or the distance of the hairpin ends from other electrically conductive component parts can also be small at other points on the circumference. For this reason, insulating is necessary especially in these areas. Therefore, depending on the construction of the electric machine, embodiment forms in which it is sufficient that only a portion of the circumference of the hairpin winding is covered by the insulating unit are also possible. However, preferred embodiment forms have a base body on which the circumference of the hairpin winding or hairpin ends is completely covered.

Since, as a result of the directly adjacent layers of the winding, the hairpin ends have a closer spacing in radial direction than in circumferential direction because of the webs between the slots, an insulation is required particularly in radial direction. The base body has a receiving area at the underside facing the hairpin ends on the plurality of openings and dividing walls. Embodiment forms have dividing walls extending preferably in circumferential direction, i.e., in tangential direction between the layers. Alternatively or additionally, dividing walls in radial direction are also possible so that there are openings for the respective hairpin ends, which improves the insulation and allows for a more precise positioning.

The openings or dividing walls have fastening elements for fastening the insulating unit to the hairpin winding. A positively engaging and/or frictionally engaging connection is produced by the fastening elements during assembly so that the insulating unit is captively connected to the hairpin winding.

Embodiment forms of an insulating unit according to one aspect of the invention are characterized in that the base body has cutouts for the connection pins of the hairpin winding to pass through. In order to allow contact between the connection pins and a separately formed interconnect, cutouts such as passages or slots can also be provided for the connection pins at outer/inner circumferential surfaces on the base body of the insulating unit. Either connection pins which are longer than the other hairpin ends can pass through these cutouts, or corresponding contacts of the interconnect can be guided to the connection pins through the cutouts.

Further embodiment forms of an insulating unit according to one aspect of the invention are characterized in that the base body comprises the interconnect for the connection pins of the hairpin winding. In order to reduce the number of parts of the electric machine and facilitate a connection to the power electronics, the interconnect for the connection to the connection pins can be integrated in the base body of the insulating unit. A further advantage of this embodiment form consists in the favorable positioning of the interconnect that it ensures and the possibility of insulating the interconnect at the same time.

Embodiment forms of the insulating unit according to one aspect of the invention are characterized in that the fastening elements are deformable areas of the openings. In order to achieve a frictionally engaging and/or positively engaging connection of the insulating unit to the hairpin ends after assembly, at least areas of the opening or of the dividing walls are deformable.

Insulating units according to one aspect of inventive embodiment forms are characterized in that the deformable areas are formed by narrowings that extend at least over a portion of the depth of the openings and reduce the inside diameter of the openings to a dimension that is smaller compared with the hairpin ends. In preferred embodiment forms, the openings have a greater inside diameter at the underside compared with the hairpin ends to facilitate the positioning and insertion of the hairpin ends during assembly. One possibility for forming deformable areas is to reduce the inside diameter in depth direction of the openings to a dimension that is smaller than the dimensions of the hairpin ends. During assembly, this accordingly results in an elastic deformation and possibly also in a plastic deformation of these areas and possibly also a deformation of the hairpin ends depending on the combination of materials and the assembly forces. The change in inside diameter can also be carried out continuously or discontinuously in depth direction.

Thereafter, the inside diameter can also become larger again to allow space for excess material or manipulation between the hairpin ends and the base body. In this way, a positively engaging connection can possibly also be achieved in addition to a frictionally engaging connection.

Further embodiment forms of an insulating unit according to one aspect of the invention are characterized in that the deformable areas are formed by an elastic material of the base body, and the openings are formed by perforations which are smaller compared with the hairpin ends. The openings of the base body can have a smaller inside diameter compared with the dimensions of the hairpin ends particularly in case of elastic materials such as elastomers, foam materials, rubber materials, and the like. These openings can be formed by suitably provided perforations. When the insulating unit is pressed onto the hairpin winding, the hairpin ends are received correspondingly along the perforations in the receiving area of the base body and are secured by the elastic deformation. In embodiment forms, insertion bevels can be provided at the perforations on the underside for easier positioning.

In further embodiment forms, an insulating unit according to one aspect of the invention is characterized in that the deformable areas are formed by the openings and/or dividing walls. These deformable areas are made of prestretched thermoplastic which are contractible through the application of heat. Through the use of a prestretched thermoplastic for the dividing walls, the openings can be formed larger than the hairpin ends and, after fitting the insulating unit to the hairpin winding, the inside diameter of the openings can be reduced to a dimension smaller than the hairpin ends through the application of heat. A materials concept of this kind is known in the domain of shrink tubing, shrink caps or split shrink caps.

Further embodiment forms of an insulating unit according to one aspect of the invention are characterized in that the fastening elements are formed by adhesive provided in the openings and/or on the dividing walls. Alternatively or additionally, embodiment forms are possible in which the openings are at least partially filled with an adhesive or the dividing walls are at least partially coated with adhesive, so that an adhesive bond is produced between the base body and the hairpin ends. Any adhesive suitable for pairing materials can be used in the embodiment forms. Adhesives that can be activated or cured in a selectively controlled manner are preferred. Examples are two-component adhesives which are only applied immediately before assembly, or the base body is saturated with the second component just before assembly, and adhesives which are activated to cure, for example, just before, during or after assembly. As used herein, "adhesive" includes not only adhesives but also plastics or other curable materials.

Insulating units according to further inventive embodiment forms are characterized in that the base body has at the upper side remote of the hairpin winding a closed upper surface to prevent penetration by hairpin ends. In order to ensure that the hairpin ends are fully insulated, the base body of the insulating unit has a closed surface at the upper side.

Preferred embodiment forms of an insulating unit according to one aspect of the invention are characterized in that the base body is formed of a plurality of parts and in that the closed upper surface is formed by a plate that is harder than the receiving area. There is a risk especially with base bodies whose receiving area is formed from a soft or elastic material that the hairpin ends will be pressed through the receiving area of the base body by the assembly forces and will protrude from the upper surface of the base body resulting in insufficient insulation. In order to prevent this, the closed upper surface on the upper side of the base body can comprise a plate made of a material that is harder than the receiving area. For example, the receiving area can be formed from an elastomer and provided with a stiff plate comprising thermosetting or thermoplastic plastic. A receiving area and base body made of a uniform material with various density such as in foam form and compact form or combinations of different classes of material are also possible, e.g., plastic for the receiving area and ceramic for the plate. A further advantage of such embodiment forms is a stiffer insulating unit which facilitates handling and results in a better, more uniform transmission of assembly forces to the circumferential surface.

Further embodiment forms of an insulating unit according to one aspect of the invention are characterized in that the openings and/or dividing walls have a softer coating compared with the material of the receiving area in order to prevent damage to the insulating varnish of the hairpin winding during assembly. The hairpins are produced from an electrically conductive material and are generally coated with an insulating varnish except for the hairpin ends. In order to prevent damage to the insulating varnish by the base body, particularly the receiving area, the surfaces of the base body, particularly of the receiving area, can be coated with a material that is softer compared with the base body.

A further subject matter of one aspect of the invention is an electric machine with a hairpin winding characterized in that an insulating unit according to one of the above-described embodiment forms is provided. Accordingly, the electric machine has the characteristics described for the insulating unit, and a good insulation of the hairpin ends and a secure fastening of the insulating unit to the hairpin winding are ensured. Further, fastening the insulating unit directly to the hairpin winding in this way offers advantages with respect to the required installation space, which possibly allows more compact constructional shapes.

Further embodiment forms of an electric machine according to one aspect of the invention are characterized in that the insulating unit is sewn to the hairpin winding. In addition to the above-described possibilities for mounting the insulating unit on the hairpin winding, the insulating unit can also be sewn to the end winding. An additional fastening of the insulating unit to the hairpin winding is ensured by this sewing, in which a thread is guided through and/or over the upper side of the insulating unit and through an open space between the hairpin ends and the stator or rotor of the electric machine, and the component parts are fixed to one another by tightening the thread. This additional fastening is especially for additional security over the life of the electric machine and for any span of time during assembly between the positioning of the insulating units and the curing and/or deformation of the fastening elements of the insulating unit.

As an alternative to sewing, it is also possible to support the insulating unit on structural component parts in the environment. In this case, the insulating unit is constructed in such a way that it is supported on an external geometry and is clamped between the hairpin ends and the housing cover. Additional fastening can be dispensed with in this way.

Aspects of the invention are also directed to a method for producing an electric machine described above with an insulating unit according to one aspect of the invention which comprises providing the hairpin winding, positioning the insulating unit on the hairpin winding, the openings at the underside of the insulating unit being positioned facing the hairpin ends, and fastening the insulating unit to the hairpin winding at least one of the following steps: pressing the hairpin ends into the openings of the insulating unit to produce a mechanical clamping connection; heating the insulating unit to achieve a shrinking or curing of the fastening elements; sewing the insulating unit to the end winding of the hairpin winding.

As has already been stated with respect to the insulating unit and electric machine, the winding, particularly the winding of the stator of an electric machine, is first provided, and a construction according to the one aspect of invention can also be used for a rotor or rotor and stator of an electric machine. The insulating unit is positioned on the end winding of the hairpin winding to produce an orientation of the hairpin ends with respect to the openings or dividing walls and of the connection pins with respect to the cutouts or interconnect. The insulating unit is subsequently fastened to the end winding, either by pressing the hairpin ends into the openings of the base body, by heating the insulating unit, particularly the receiving area of the base body, or by sewing the insulating unit to the end winding. Combinations of these fastenings are also possible. For example, after pressing in, further fastening elements can be activated additionally by heating. Sewing can also be carried out in combination with pressing in and/or heating in order to achieve additional security and possibly to ensure that the position of the insulating unit is fixed in relation to the end winding until, or while, further fastening elements cure.

BRIEF DESCRIPTION OF THE DRAWINGS

The invention will be described in more detail in the following referring to drawings. Like reference numerals designate like or similar components. The drawings show particularly.

DETAILED DESCRIPTION OF THE PRESENTLY PREFERRED EMBODIMENTS

Figure 1:
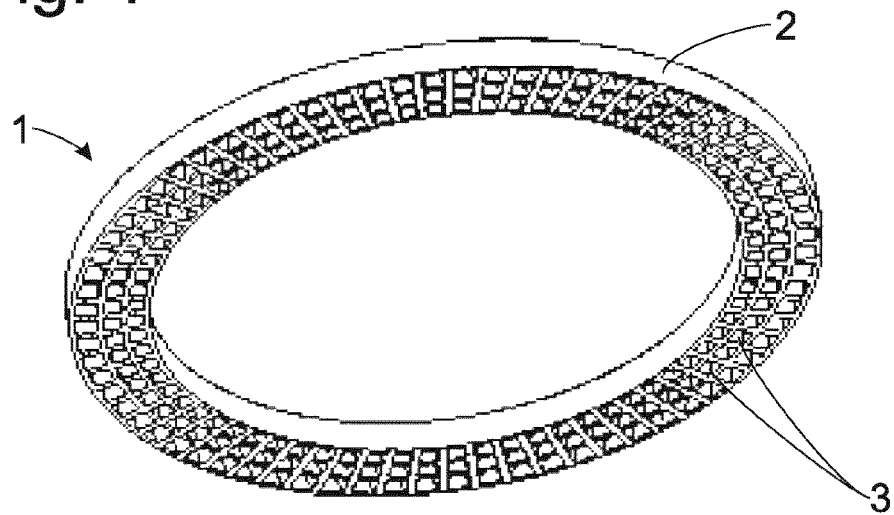
FIG. 1 is an insulating unit.

FIG. 1 shows an embodiment form of an insulating unit (1) according to one aspect of the invention in a perspective bottom view. Insulating unit (1) comprises a base body (2) having a plurality of openings (3) at the underside at the receiving area. The openings (3) are arranged adjacent to one another in a plurality of concentric rings corresponding to the quantity of layers of the winding of the electric machine in order to receive hairpin ends (5), not shown in FIG. 1. The depicted construction is in the form of a circular ring extending around 360°. Alternatively, solid disk constructions are also possible, for example, for rotor windings or in case a simultaneous covering of the inner area is to be provided. Also, corresponding circle segments or annular segments extending over only a portion of the circumference are also possible. In such cases, it may be that portions of the hairpin ends are not insulated or a plurality of insulating units are used, which are distributed over the circumference. Split constructions can also be advantageous particularly for electric machines with large diameters.

Figure 2:
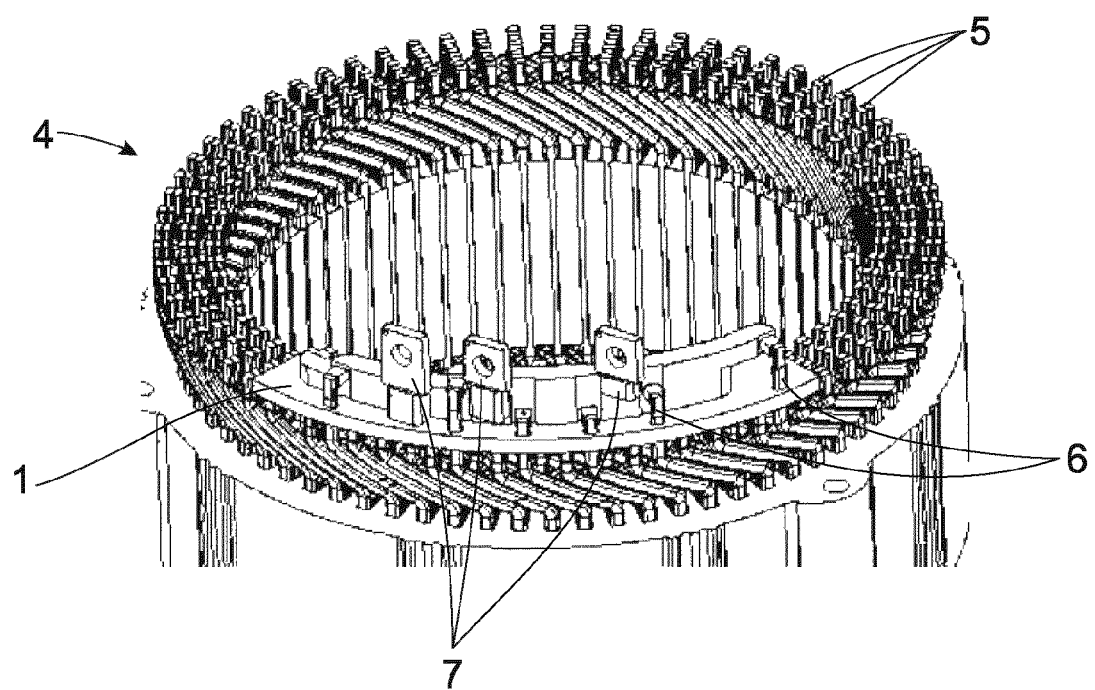
FIG. 2 is an insulating unit.

FIG. 2 shows an upper area of a stator with end winding (4). The end winding is that of a hairpin winding in which a plurality of shaped rods are correspondingly arranged in pairs and electrically conductively connected to one another by their contact points so as to form the hairpin ends (5). The coils of the hairpin winding are generated from the shaped rods through the connections to the hairpin ends (5) and have individual connection pins (6) at the coil ends in each instance. In the depicted embodiment example, the insulating unit (1) extends only over the circumferential area of the hairpin winding in which the connection pins (6) are located. Depending on the design layout of the electric machine, it may be sufficient to insulate the hairpin ends (5) in this area because they can be spaced apart from one another sufficiently in the rest of the circumference. Alternatively, the rest of the circumference could also be insulated, for example, with a further insulating unit as described referring to FIG. 1. In the depicted embodiment example, an interconnect (7) for connecting the connection pins (6) to power electronics, not shown, for controlling the electric machine is integrated in the insulating unit (1).

Figure 3:
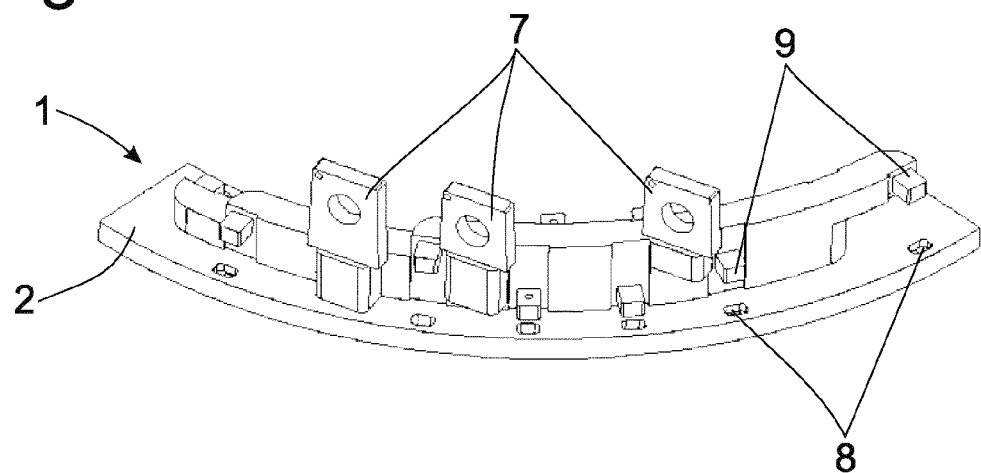
FIG. 3 is a perspective view of a stator in the area of the end winding with an insulating unit according to FIG. 2.

FIG. 3 shows an insulating unit (1) according to the embodiment example shown in FIG. 2. The cutouts (8) for the connection pins (6) at the upper side in the base body (2) are discernable in the perspective view. The connection pins (6) pass through these cutouts (8) through the base body (2) and can be electrically conductively connected to the interconnect contacts (9). The interconnect contacts (9) connect the connection pins (6) to the respective appropriate interconnect (7). This connection preferably runs inside of the base body (2) in order to ensure a corresponding insulation.

The integration of the interconnect (7) in the insulating unit (1) offers the further advantage of reducing the number of parts to assemble. Overmolding or potting the interconnect (7) with a plastic is provided as production method.

Figure 4:
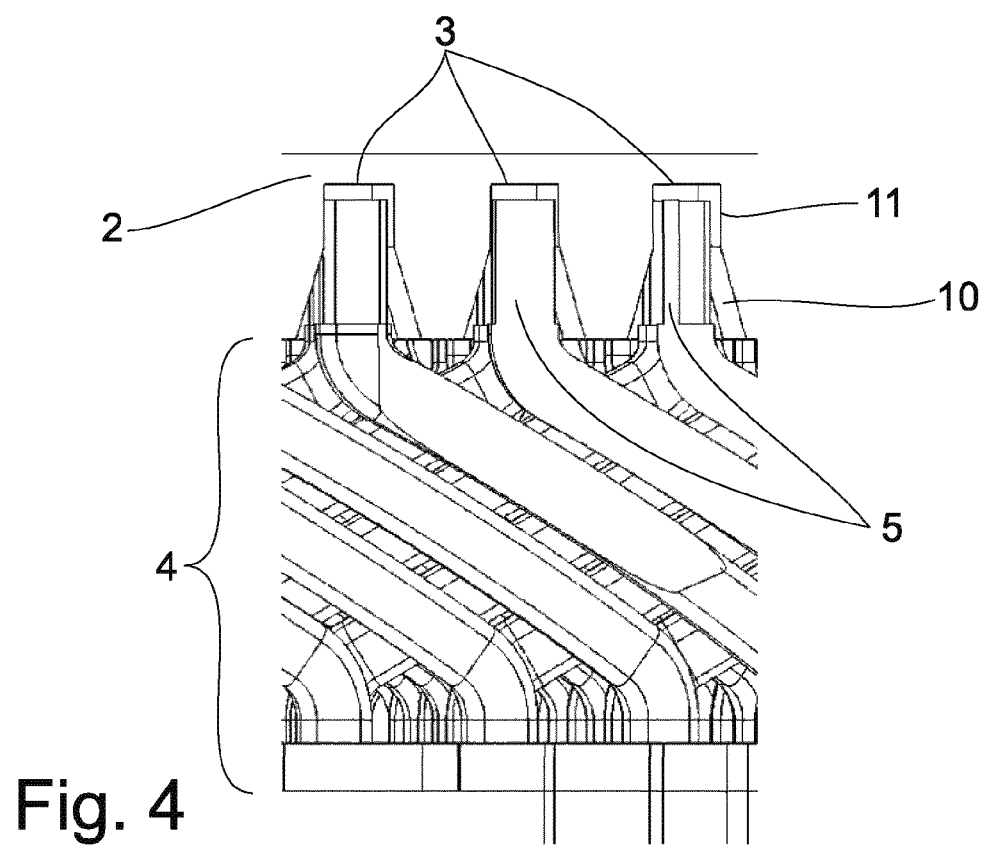
FIG. 4 is a section along the circumferential direction of an electric machine.

The sectional view shown in FIG. 4 shows a partial area of a stator with end winding (4). The base body (2) of an insulating unit (1) is mounted on the hairpin ends (5). The hairpin ends (5) are inserted into the openings (3). The openings (3) comprise in each instance an area of a narrowing (10) in which the inside diameter of the opening (3) decreases from the underside in depth direction of the opening (3). The narrowing (10) adjoins an area with reduced inside diameter (11) that has a smaller inside diameter compared with the diameter of the hairpin ends (5). Owing to the reduced inside diameter in the area of the smaller inside diameter (11) of the opening (3), the pressed-in hairpin ends (5) cause a deformation to take place that generates a clamping force that fixes the base body (2) to the hairpin ends (5). The deformation can be elastic and/or plastic. Depending on the structural layout, a positively engaging connection in the manner of an undercut or catch can also result or be provided. The narrowing (10) can run continuously as is shown or can also change in a discontinuous manner, and combinations thereof. Further, another area with a greater inside diameter can follow the area of reduced inside diameter (11) in depth direction.

Figure 5:
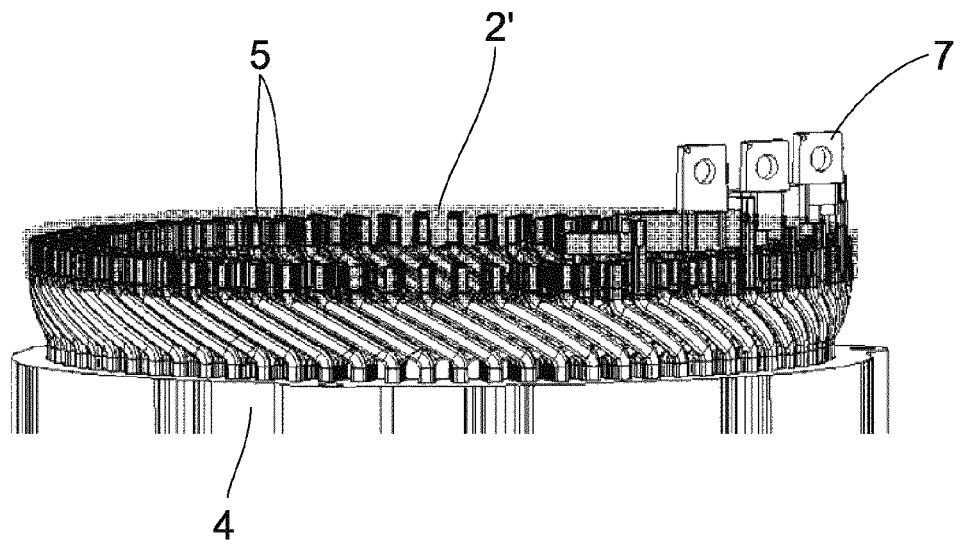
FIG. 5 is a perspective view of a stator in the area of the end winding with an insulating unit.

FIG. 5 shows another embodiment example of the invention in a partial area of a stator with end winding (4) in which the base body (2') of an insulating unit (1) is mounted on the hairpin ends (5) and an interconnect (7) is provided. In this embodiment example, the base body (2') comprises an elastic material such as an elastomer, rubber and the like or a foamed plastic. The base body (2') is depicted as partially transparent to show the embedded hairpin ends (5). The base body (2') has openings (3), not shown, having a smaller inside diameter compared with the hairpin ends (5). In particular, small perforations on the underside of the base body (2') at the appropriate locations may be sufficient to prevent an uncontrolled tearing of the elastic material when the hairpin ends (5) are pressed in. The effect is analogous to that of the area with smaller inside diameter (11) described referring to FIG. 4. This effect is present over the entire length of the hairpin ends (5) pressed into the base body (2'). Owing to the elastic material, a narrowing (10) analogous to FIG. 4 can possibly be dispensed with. A narrowing (10) of this kind can be advantageous for positioning at least in the upper surface of the underside. Particularly in embodiment forms of this kind, preferred embodiment forms have a plate at the upper side of the base body (2') that is harder compared with the material of the receiving area for the hairpin ends (5) in order to prevent the hairpin ends (5) from being pressed completely through the base body (2'). A corresponding harder plate can also have these and further advantages in all of the other embodiment forms described herein such as increased stability with respect to shape and a better distribution of assembly forces.

Figure 6:
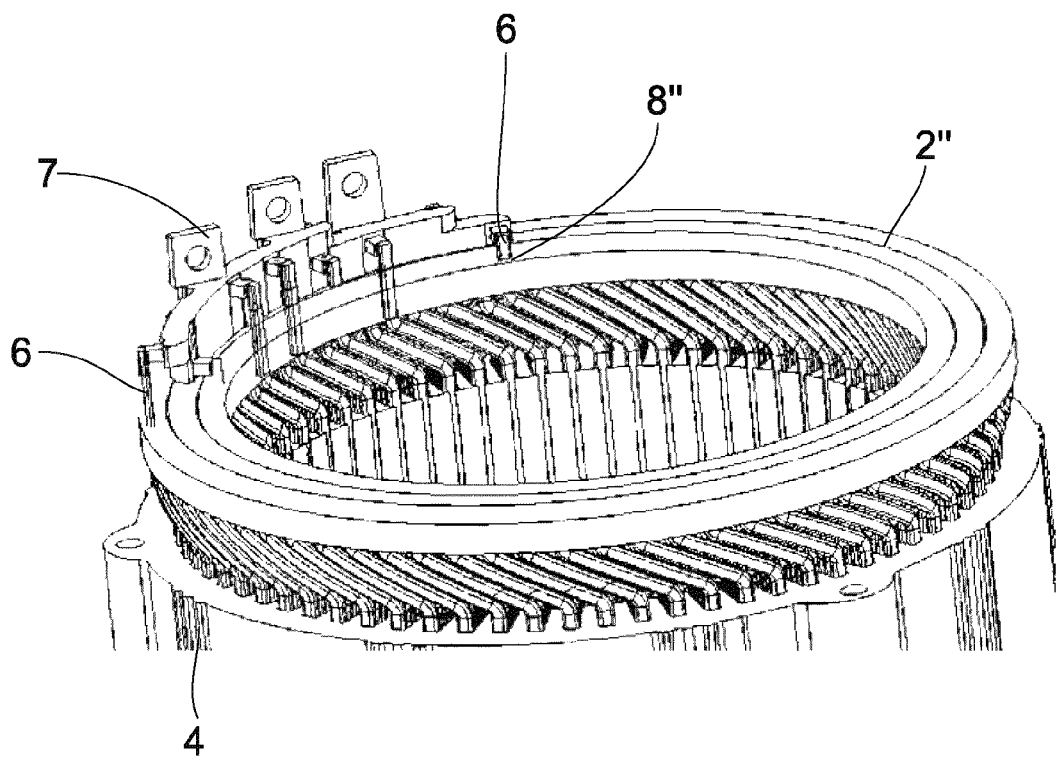
FIG. 6 is a perspective view of a stator in the area of the end winding with an insulating unit.

A further embodiment example of one aspect of the invention is shown in FIG. 6. In this case also, a partial area of a stator with end winding (4) is arranged on a base body (2"). The connection pins (6) are guided through cutouts (8") through the base body (2") so as to connect to an interconnect (7). As in the other embodiment examples depicted, the interconnect (7) can be formed integral with or in multiple parts with the base body (2") or can also be provided as a separate component part.

Figure 7:
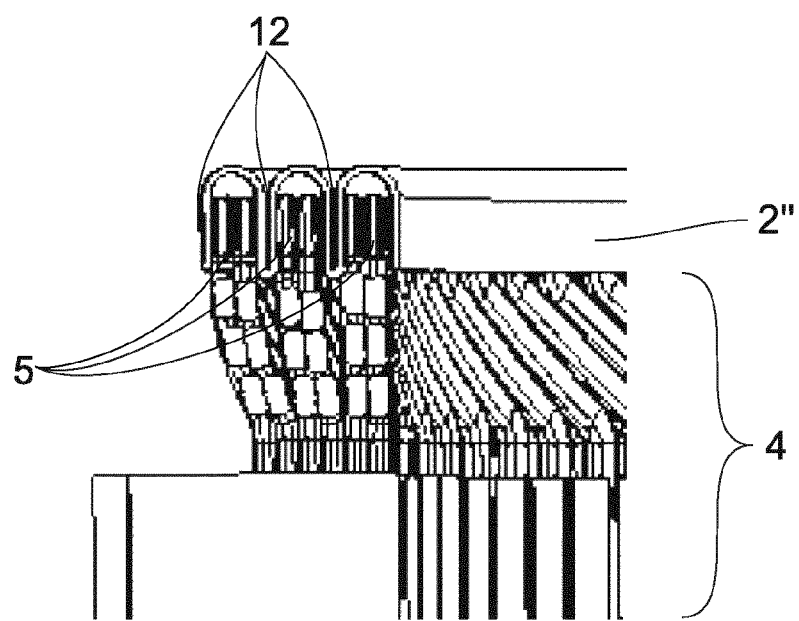
FIG. 7 is a section along the radial direction of an electric machine according to FIG. 6.

FIG. 7 shows a sectional view through a partial area of the embodiment example according to FIG. 6. The section extends in radial direction in this diagram. The partial area of the stator with end winding (4) is depicted in the same way as in the other embodiment examples, but a hairpin winding with three layers is provided. Accordingly, there are three concentric layers of hairpin ends (5). In the depicted embodiment example, the base body (2") has only concentric dividing walls (12) which are positioned between and adjacent to the concentric layers of hairpin ends (5). The base body (2") is produced from a prestretched thermoplastic which contracts again when heat is applied so that the base body (2") is fastened to the hairpin ends (5). The base body (2") is produced from a correspondingly shaped film. Annular openings (3) for receiving the hairpin ends (5) are formed by the dividing walls (12) protruding in axial direction of the electric machine. Constructions with concentric dividing walls (12) are preferred because in hairpin windings generally the distance between the hairpin ends (5) is the distance that is critical for insulation, i.e., the shortest distance. Alternatively or additionally, however, constructions with dividing walls (12) in radial direction, or combinations thereof, are also possible.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An insulating unit for an electric machine comprising:
a hairpin winding, comprising:
a plurality of connection pins configured to electrically connect to an interconnect and a plurality of hairpin ends that are welded;
a base body having an insulating material that extends at least over a portion of a circumference of the hairpin winding, the base body comprises at an underside a receiving area that faces the hairpin winding and which has openings configured to receive the plurality of hairpin ends; and
circumferentially extending dividing walls are arranged between the openings that extend at least in an uninterrupted circumferential direction,
wherein the openings and/or dividing walls have fastening elements configured to frictionally engage and/or positively engage to the plurality of hairpin ends.

2. The insulating unit according to claim 1, wherein the base body has cutouts for the plurality of connection pins of the hairpin winding to pass through.

3. The insulating unit according to claim 1, wherein the base body comprises the interconnect for the plurality of connection pins of the hairpin winding.

4. The insulating unit according to claim 1, wherein the fastening elements are deformable areas of the openings.

5. The insulating unit according to claim 4, wherein the deformable areas are formed by narrowings that extend at least over a portion of a depth of the openings and reduce an inside diameter of the openings to a dimension that is smaller relative to the plurality of hairpin ends.

6. The insulating unit according to claim 4, wherein the deformable areas are formed by an elastic material of the base body and the openings are formed by perforations which are smaller compared with the plurality of hairpin ends.

7. The insulating unit according to claim 4, wherein the deformable areas are formed by the openings and/or dividing walls, wherein the latter comprise prestretched thermoplastic contractible through an application of heat.

8. The insulating unit according to claim 1, wherein the fastening elements are formed by adhesive provided in the openings and/or on the dividing walls.

9. The insulating unit according to claim 1, wherein the base body has at an upper side remote of the hairpin winding a closed upper surface to prevent penetration by the plurality of hairpin ends.

10. The insulating unit according to claim 9, wherein the base body is formed of a plurality of parts, and the closed upper surface is formed by a plate which is harder than the receiving area.

11. The insulating unit according to claim 1, wherein the openings and/or dividing walls have a softer coating compared with a material of the receiving area in order to prevent damage to an insulating varnish of the hairpin winding during assembly.

12. An electric machine with a hairpin winding, comprising an insulating unit comprising:
  a hairpin winding, comprising:
    a plurality of connection pins configured to electrically connect to an interconnect and a plurality of welded hairpin ends;
  a base body having an insulating material that extends at least over a portion of a circumference of the hairpin winding, the base body comprises at an underside a receiving area that faces the hairpin winding and which has openings configured to receive the plurality of hairpin ends; and
  circumferentially extending dividing walls are arranged between the openings that extend at least in an uninterrupted circumferential direction,
  wherein the openings and/or dividing walls have fastening elements configured to frictionally engage and/or positively engage to the plurality of hairpin ends.

13. The electric machine according to claim 12, wherein the insulating unit is sewn to the hairpin winding.

14. A method for producing an electric machine according comprising:
  providing a hairpin winding;
  positioning an insulating unit on the hairpin winding, wherein openings at an underside of the insulating unit are positioned facing hairpin ends and circumferentially extending dividing walls are arranged between the openings that extend at least in an uninterrupted circumferential direction; and
  fastening the insulating unit to the hairpin winding by at least one of the following:
  pressing the hairpin ends into the openings of the insulating unit to produce a mechanical clamping connection;
  heating the insulating unit to achieve a shrinking or curing of fastening elements; and
  sewing the insulating unit to an end winding of the hairpin winding.

\* \* \* \* \*